May 28, 1957 T. W. HELM ET AL 2,793,874
TRUE VERTICAL TRAVEL INDEPENDENT SUSPENSION FOR AUTOMOTIVE VEHICLES
Filed March 22, 1955 4 Sheets-Sheet 4
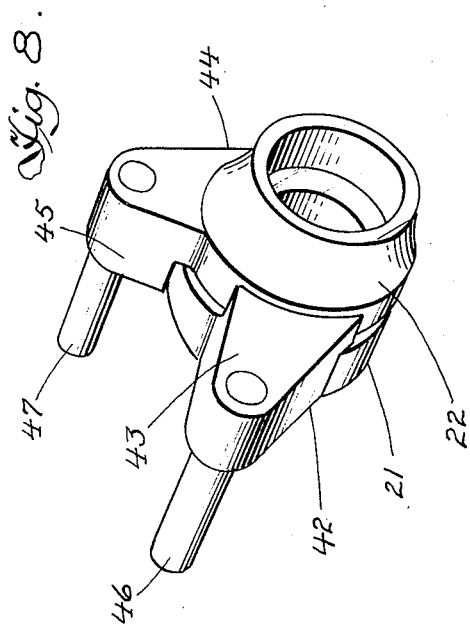
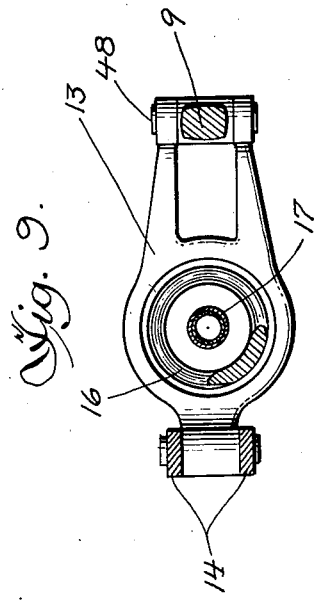
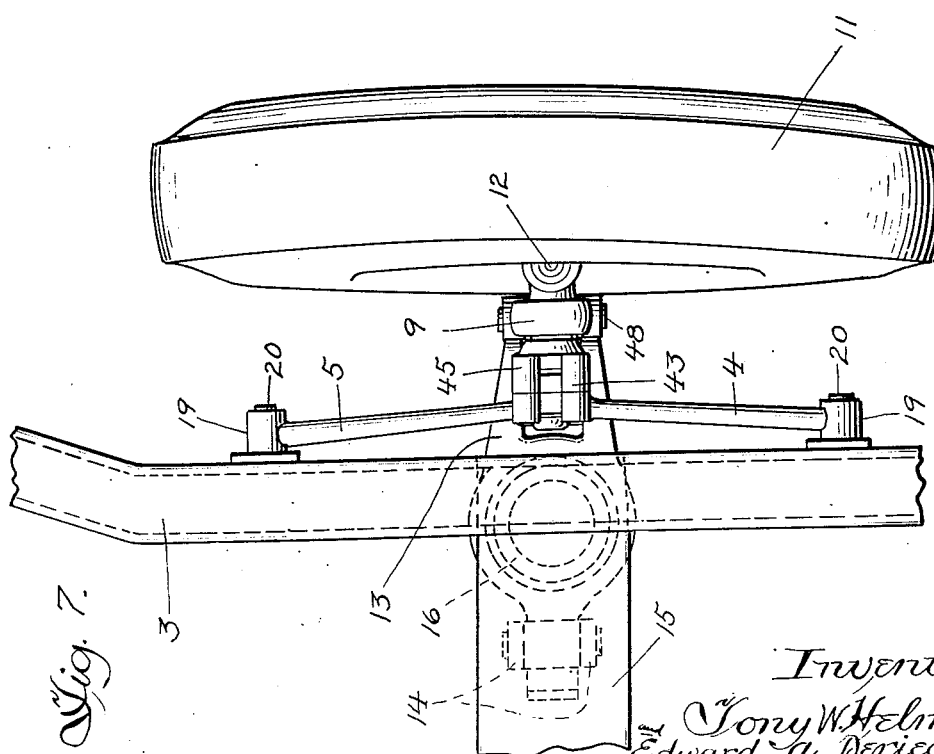
Inventors,
Tony W. Helm
Edward A. Derieg
By Frederick F. Mason Atty

United States Patent Office 2,793,874
Patented May 28, 1957

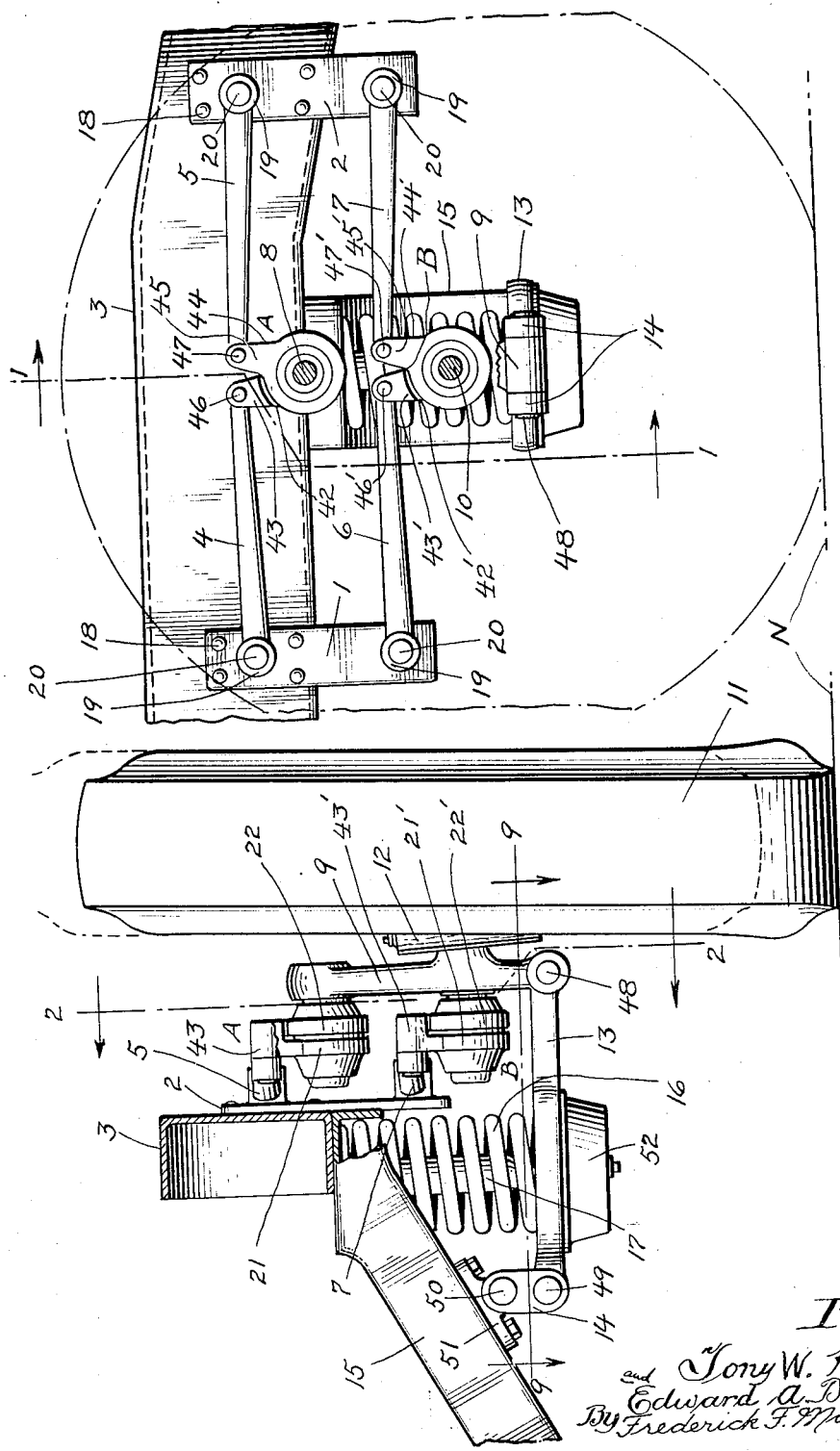

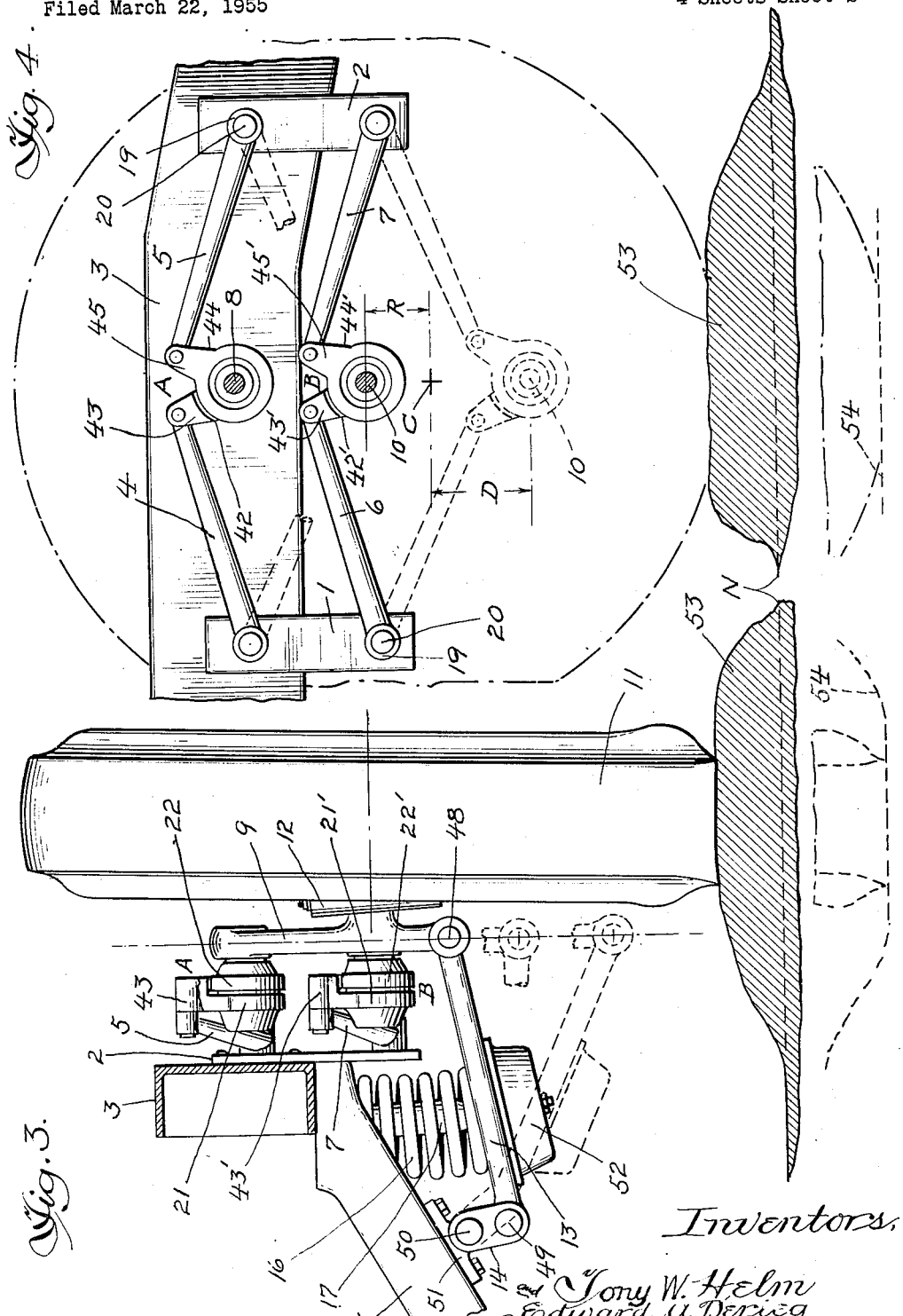

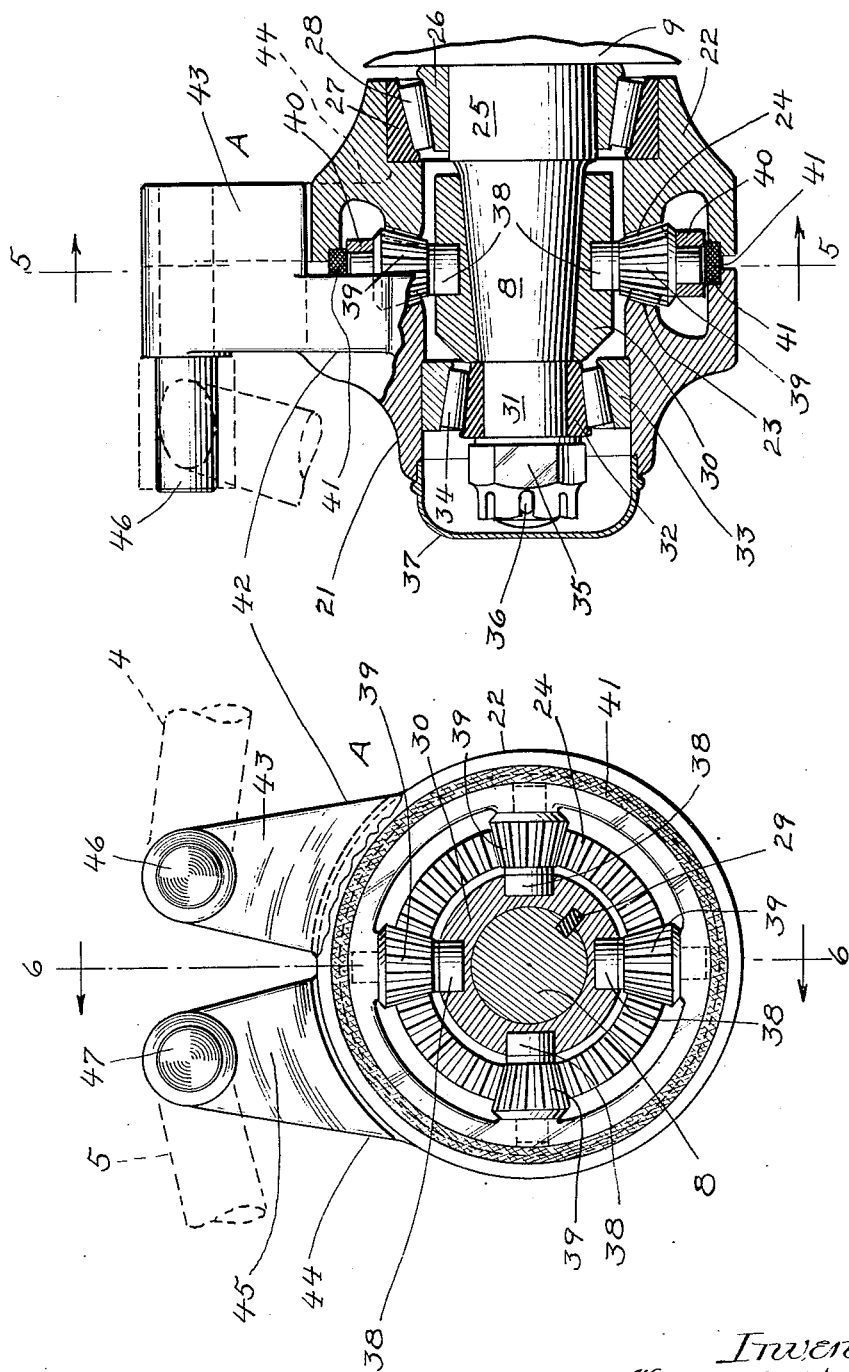

2,793,874

TRUE VERTICAL TRAVEL INDEPENDENT SUSPENSION FOR AUTOMOTIVE VEHICLES

Tony W. Helm and Edward A. Derieg, Chicago, Ill.

Application March 22, 1955, Serial No. 495,850

9 Claims. (Cl. 280—124)

This invention relates to an independent suspension for automotive vehicles, and more particularly to such suspension in which the wheel will have true vertical travel with relation of the vehicle frame when relative movement between the wheel and the frame occurs bodily in an up and down direction from bumps or depressions in the road, increasing or decreasing the weight of the load in the vehicle, or for other reasons. This true vertical travel is accomplished independently of the rotation of the wheels and regardless of whether or not the wheels stand in parallel vertical planes.

Generally, the front wheels of an automotive vehicle are not in truly vertical planes when the vehicle is traveling straight forward. In cases where the top of the wheel is tipped outwardly away from the car the wheel is referred to as having positive camber, whereas in cases where the top of the wheel is tipped inwardly toward the centerline of the vehicle, the wheel is referred to as having negative camber. Assuming the wheel to have positive camber, it will be understood that when the vehicle is in forward motion the tendency of the wheel will be to turn out unless restrained by a like degree of such tendency in the opposite direction in the other front wheel, in which latter case the vehicle will travel straight forward.

However, it should be remembered that a wheel having positive camber creates in effect a cone, the center line of which is defined by extending the axis of rotation outwardly until it intersects the road surface, and the outer surface of which cone falls in the lines extending from said intersection to the periphery of the wheel tire. This causes the wheel tire to have several different diameters which decrease outwardly of the contact of the tire with the road surface toward the apex of the cone. As all portions of the wheel and its tread make the same number of revolutions, it will be apparent that the smaller diameters must catch up with the greater distance traveled by the larger diameters, thus resulting in wear to those portions of the tire tread required to do said catching up. This tire wear would be magnified in tires of larger cross sections and greater areas of contact, unless the camber be decreased and the sidewise inclination of the kingpin be increased.

In many automotive vehicles the wheels are so mounted on the frame that each wheel is movable upwardly and downwardly independently of any of the other wheels. This is called "independent suspension." Such independent suspensions have incorporated therein the springs for resiliently supporting the vehicle body on the wheels, and those for the front wheels additionally include steering knuckles, kingpins, and the necessary steering connections.

As will be understood, in independent suspensions, the height of the spring will frequently change due to varying loads, and varying influences during the operation of the vehicle, and that in most independent suspensions heretofore known the camber of the wheel will change for each change in height of the spring. The direction of the influence of the wheel to turn in or out, when the camber is zero, is controlled by which wheel bearing may be carrying the load. For illustration, the wheel will tend to turn out if the inner bearing is carrying the load, and to turn in if the outer bearing is carrying the load. At such times the load can be caused to change from one bearing to the other by irregularities in the road surface, thus disturbing the positiveness with which the wheels will travel straight ahead.

With independent suspensions as known prior to our present invention, positive camber of the outside front wheel generally increases when the vehicle turns a corner. Long life for tires could be accomplished if the camber angle could always be maintained zero during travel of the vheicle, because then all portions of the wheel tread in contact with the road surface would have the same rolling radius. This however, could not be done with independent suspensions as heretofore known, as such ideal conditions cannot be continuously maintained because of varying loads, and varying influences occurring during travel of the vehicle, which change the amount of camber from time to time. It is well known that in general a moving vehicle will tend to pull to the side where the camber is the highest. Defective camber will cause very considerable and damaging tire wear.

With current automobiles, as built prior to the present invention, the camber of the front wheels quite frequently changes from one cause or the other, and oftentimes causes considerable damage to one or both of the front tires from continued driving. The occurrence of bumps against one of the front wheels, such as striking the curb in diagonal parking zones, and other similar bumps, can, and often does upset the particular original setting of the front wheels, and change the camber of that particular wheel to the point where sidewise scraping of the tire tread on the road surface will ultimately cause flat or cupped places on the tire tread, and develop tapping or thumping noises of the tire against the road. This requires the taking of the car to a service station for a caster-camber front end conditioning, which can be more or less expensive, as well as delaying the use of the car. This change of the amount of camber on either of the front wheels, is eliminated by the present invention in which the amount of camber, or absence of camber, in either or both of the front wheels always remains the same as originally set.

Among the objects of our invention are: to provide a novel and improved true vertical travel independent suspension for automotive vehicles; to provide an independent suspension that will overcome the above mentioned disadvantages; to provide an independent suspension that will maintain the same camber for which the wheel is initially set; to provide an independent suspension in which the camber angle will not be changed under any load or road conditions encountered; to lessen tire wear by providing an independent suspension in which the caster, camber and toe-in may be set as desired when the vehicle is unloaded, and no matter what the spring heights are during the operation of the vehicle, the caster and camber will remain the same regardless of bumps and depressions encountered on the road; to eliminate the shifting of the load from one wheel bearing to the other, and to render more positive, safe and easy steering of the vehicle with minimum of tire wear; to provide an independent suspension in which the wheel, when it moves upwardly and downwardly with relation to the vehicle frame, will always bodily move truly vertically with relation to the frame, and always maintain the camber, or absence of camber, constant as initially set; and such other objects, advantages and capabilities as will later more fully appear.

Our invention further resides in the combination, construction and arrangement of parts illustrated in the accompanying drawings, and while we have shown therein a preferred embodiment we wish it understood that the same is susceptible of modification and change without departing from the spirit of our invention.

In the drawings:

Fig. 1 is a view looking rearwardly toward the left front wheel and its independent suspension from the frame of an automotive vehicle in accordance with our invention, as viewed on the line 1—1 of Fig. 2, but showing the wheel in edge elevation and standing on the normal road level.

Fig. 2 is a longitudinal vertical section on the line 2—2 of Fig. 1, but indicating the relative position of the wheel by broken lines.

Fig. 3 is a view similar to Fig. 1, but showing the wheel and associated parts in solid lines in the position they occupy when the wheel is passing over a bump in the road, and showing fragmentarily in dotted lines the position the adjacent hinged ends of the steering knuckle support arm and the A-frame would occupy when the wheel would be on the normal road level, and showing in lower dotted lines the position the A-frame and the lower end of the steering knuckle support arm, and the wheel would occupy when the wheel is passing over a depression or hole in the road.

Fig. 4 is a longitudinal vertical section on the line 2—2 of Fig. 1, but omitting the A-frame, spring, shock absorber, and cross frame of the chassis, and showing the guide arms and the guiding gear assemblies in the positions they would occupy as referred to in the brief description of Fig. 3.

Fig. 5 is a section through one of the guiding gear assemblies, taken on the line 5—5 of Fig. 6, except to show the two upstanding arms and their journal pins in elevation for clearness of understanding.

Fig. 6 is a section on the line 6—6 of Fig. 5, except to show the two upstanding arms in elevation, one behind the other, for better understanding.

Fig. 7 is a plan view of Fig. 1.

Fig. 8 is a perspective view of the two movable cage or housing members of the guiding gear assembly, in one of the relative positions they would occupy during operation, but omitting the associated inner parts.

Fig. 9 is a section on the line 9—9 of Fig. 1.

In the form shown for illustrative purposes in the drawings, and referring to Figs. 1-4, our invention comprises, in general, a pair of brackets 1 and 2 firmly secured to, and longitudinally spaced along, the outer side face of the car frame side channel 3, two vertically spaced pairs of guide arms 4—5, and 6—7, each of said guide arms being pivoted at its outer end to its respective bracket 1 or 2, two duplex guiding gear assemblies A and B each pivotally mounted to the inner ends of its respective pair of guide arms, the upper guiding gear assembly A having a short shaft 8 fixed at its outer end to the upper end portion of a steering knuckle support arm 9 and the lower guiding gear assembly B having a short shaft 10 fixed to a lower portion of the steering knuckle support arm 9 which latter carries the usual steering knuckle and spindle, not shown, upon which is mounted a front wheel 11 which is steered through a kingpin 12, by any suitable steering linkage not shown, an A-frame 13 being pivotally connected at its outer end to the lower end of the steering knuckle support arm 9 and at its inner end to a pair of shackle links 14 which are pivotally connected to the transverse frame member 15, the A-frame 13 supporting the coil spring 16 and the hydraulic shock absorber 17.

The brackets 1 and 2 are rigidly fixed to the car frame side bar 3 by rivets, bolts, or the like 18, or by welding or other suitable fastening means, as desired. The guide arms 4—7 are each formed at its outer end with an integral hub or the like 19 having a bore mounted with a snug but rotatable fit upon a stub shaft 20 rigidly fixed to its appropriate bracket 1 or 2 to extend outwardly at right angles therefrom. As seen in Figs. 2 and 4 there are four of these stub shafts 20, suitably positioned to properly locate the guide arms to operate as later more fully understood.

The guiding gear assemblies A and B each being alike, only one of them need be described in detail, it being understood that assembly A is pivotally connected between the inner ends of the upper guide arms 4 and 5, and assembly B is pivotally connected between the inner ends of the lower guide arms 6 and 7 as shown in Figs. 2 and 4, where they operate in identical manners. Referring to Figs. 5 and 6 for a detail description of guiding gear assembly A, there is provided an inner cage member 21, and an outer cage member 22, cage member 21 having an integral bevel ring gear 23 and cage member 22 having an integral bevel ring gear 24, these ring gears being laterally spaced apart a sufficient distance to operatively receive a set of bevel spider gears later more fully described. As seen in Fig. 6 the short shaft 8, which is fixed to the steering knuckle support arm 9, extends into and through both of the cage members 21 and 22, and next to the adjacent face of support arm 9 shaft 8 has fixed to its cylindrical portion 25 an inner raceway member 26. The outer cage member 22 has fixed therein, opposite raceway member 26, an outer raceway member 27, there being a set of roller bearings 28 rollably mounted between the two raceway members 26 and 27, to permit of rotary movement of the outer cage member 22 on shaft 8.

Fixed by a key 29, or other suitable fastening means, to the central tapered portion of shaft 8, is a hub or collar 30. Fixed to the smaller cylindrical portion 31 of shaft 8, just beyond the hub or collar 30, is an inner raceway member 32. The inner cage member 21 has fixed therein, opposite raceway member 32, an outer raceway member 33, there being a set of roller bearings 34 rollably mounted between the two raceway members 32 and 33, to permit of rotary movement of the inner cage member 21 on shaft 8. The roller bearings 28 and 34 are reversely inclined, and are held in proper adjustment by a nut 35, secured in adjusted position on the inner end of shaft 8 by a cotter pin 36, so as to hold the inner and outer cage members 21 and 22 rotatably together on the shaft 8 without looseness. The inner cage member 21 is provided with a dust cap 37 covering the space within which the nut 35 is located. Fixed in the hub or collar 30 to extend radially outwardly therefrom at circumferentially equal distances, in a plane at right angles to the axis of shaft 8, is any desired number of stub shafts 38, four being shown for illustrative purposes in the drawings. Each of these stub shafts 38 is formed with a reduced diameter to form a shoulder upon which seats the inner end of a bevel spider gear 39, each of these spider gears meshing on opposite sides with the two bevel ring gears 23 and 24. Fixed to the outer end portion of each of stub shafts 38, by a pin or otherwise as desired, is a sleeve 40, so positioned as to snugly but rotatably hold the spider gear 39 on the stub shaft between the sleeve 40 and the shoulder on the shaft at the inner end of the spider gear, as seen in Fig. 6. Or, if desired, instead of the sleeves 40, skirts may be formed on each of the cage members 21 and 22, for each of the gears 39, to hold them in rotatable engagement with the shoulders on the stub shafts at the inner ends of these gears, as suggested in Fig. 5.

In order to prevent the entry of dust and dirt to the gears 39 and ring gears 23 and 24, a felt ring 41 is secured in suitable notches between the slightly spaced adjacent edges of the cage members 21 and 22, around the outer circumference of the space within which the gears 39 are located. The inner cage member 21 is integrally formed with an upstanding arm 42 which, just beyond the main circumference of the outer cage member 22, extends laterally outwardly in the form of a thickened head 43 to overlap a substantial portion of the main outer circumferential surface of the outer cage member 22. The outer cage member 22 is also formed with a similar upstanding arm 44 which just beyond the main circumference of the inner cage member 21 extends laterally inwardly in the form of a thickened head 45 to overlap a substantial portion of the main outer circumferential surface of the inner cage member 21. The thickened head 43 of the inner cage arm 42 extends outwardly, to the right as viewed in Fig. 6, and the thickened head 45 of the outer cage member arm 44 extends inwardly to the left directly behind thickened head 43 as viewed in Fig. 6, and directly to the left thereof as viewed in Fig. 5.

In Fig. 5, strictly speaking, if this view were an exact section on line 5—5 of Fig. 6, certain portions of the cage member arms and their thickened heads and journal pins would not be seen, but they have been included in elevation in Fig. 5 to give a clearer understanding of the guiding gear assemblies. In this connection attention is called to Fig. 8 which shows the two cage members in perspective and omitting the shaft 8, or 10, and the steering knuckle support arm 9. Referring to Figs. 5, 6 and 8, the thickened head 43 of the arm 42 has fixed therein a journal pin 46, and the thickened head 45 of the arm 44 has fixed therein a journal pin 47. Each of journal pins 46 and 47 extends inwardly toward the vehicle frame side bar 3, these pins being parallel with each other and having their inner ends spaced outwardly a short distance from said side bar, as seen in Figs. 1, 3 and 7.

Referring to Figs. 2 and 4, it will be seen that the upper forward guide arm 4 is pivotally mounted at its inner end on journal pin 46 of arm 42 of guiding gear assembly A, and the upper rear guide arm 5 is pivotally mounted at its inner end on journal pin 47 of arm 44 of guiding gear assembly A. The lower forward guide arm 6 is pivotally mounted at its inner end on journal pin 46' of arm 42' of guiding gear assembly B, it being previously explained that guiding gear assemblies A and B are of identical construction except for being mounted at different vertical positions on the steering knuckle support arm 9. The lower rear guide arm 7 is pivotally mounted at its inner end on journal pin 47' of arm 44' of guiding gear assembly B. The pivotal connections of the guide arms 4—7 and their respective frame brackets and guiding gear assemblies, are rotatively snug and free from looseness, rattles or squeaks.

Referring to Figs. 1–3 and 7, the A-frame 13 is pivotally connected at its outer end to the lower end of the steering knuckle support arm 9 by a pivot pin 48 to permit articulation between these two parts. A-frame 13 at its inner end is pivotally connected by a pivot pin 49 to the lower end of a pair of shackle links 14 which at their upper ends are pivoted by a pin 50 to a support member 51 which in turn is firmly secured to the transverse frame member 15, whereby the A-frame 13, the links 14, and the frame member 15, are so connected that the A-frame and the links may have swinging movement with relation to the transverse frame member and each other. Secured to the lower face of the A-frame 13 adjacent its rear portion, is a seat member 52 within which is seated a strong coil spring 16 the upper end of which is seated within a suitable seat secured to the lower face of the frame side bar 3, whereby this coil spring resiliently receives its share of the vehicle load and transmits the weight thereof through the A-frame 13 and steering knuckle support arm 9 to the wheel 11. Also connected between the seat member 52 and the vehicle frame is a hydraulic shock absorber 17.

The coil spring, shock absorber, and other parts are so adjusted that when the vehicle is carrying a normal load, the guide arms 4—7 will occupy the position shown in Fig. 2, at which time the guide arms are approximately horizontal and parallel, and the gear-cage member arms 42 and 44 of guiding gear assembly A, and the gear-cage member arms 42' and 44' of guiding gear assembly B, are in approximately their respective positions of closest approach, as shown in Fig. 2. At this time the front wheels of the vehicle will be in contact with the normal smooth road level.

Referring back to Figs. 5 and 6, it will be understood that both of the inner and outer cage members 21 and 22 are capable of rotation on the shaft 8, or shaft 10, both of the assemblies A and B being alike, but due to the spider gears 39 meshing on their opposite sides with the ring gears 23 and 24, it will be clear that rotation of either of the inner or outer cage members 21 or 22 in one direction will rotate the other one in the opposite direction by an equal amount. In other words, if the inner cage member 21 rotates clockwise the outer cage member 22 will rotate counterclockwise, and vice versa, in equal amounts. It will also be noted in Figs. 2 and 4 that the centerlines of shafts 8 and 10 of guiding gear assemblies A and B fall in the same transverse vertical plane with relation to the vehicle frame, and will always move together as a unit in that plane during operation of the vehicle.

While only the left front wheel and its true vertical travel independent suspension are shown and described herein in detail, it is to be understood that the suspension on the frame of the other front wheel will be identical except to extend from the other side of the frame, but to produce the same results. We wish it understood however, that the independent suspension of the present invention may also be used in connection with the rear wheels of an automotive vehicle if desired, in which case the steering mechanism would be omitted.

If a small amount of positive camber is desired in the front wheel, it, together with the desired amount of caster, and/or toe-in, will be provided for in the suspension when built, and after the same is installed on the vehicle these factors will always remain constant without change, for the reason that by the use of the present invention any up or down bodily movement of the wheel will always be in a true vertical direction with relation to the vehicle frame. In other words no subsequent adjustment of camber or caster is necessary, because the steering knuckle support is originally designed to incorporate these factors as desired, after which no further adjustments are required because of the true vertical travel at all times of the independent suspension.

As will be understood in Fig. 8, the thickened head 45, of arm 44, at its bottom curved surface where it overlaps the main outer circumference of the inner cage member 21, is spaced radially away therefrom a sufficient distance to freely clear the same as the cage members 21 and 22 rotate in opposite directions during operation. The same is also true of the bottom curved surface of the thickened head 43, of arm 42, where it overlaps the main outer circumference of the outer cage member 22. This enables the two thickened heads 43 and 45 to be one directly back of the other in a circumferential direction, to present the journal pins 46 and 47 equal distances to pivotally receive the guide arms 4 and 5, or 6 and 7, without interfering with the movements of the arms 42 and 44, and of the cage members 21 and 22.

In the operation of our novel independent suspension for automotive vehicles, and referring to Fig. 1, it will be seen that the front portion of the vehicle rides on the front coil springs 16. These coil springs and associated parts are so designed that when the vehicle is carrying a normal load and the front wheels are traveling over a normal level road surface, the parts will be in the position shown in Fig. 1, see also Fig. 2. In this position the guide arms 4—7 are nearly horizontal, and the arms 42 and 44 are approximately at their closest approach to each other. It will also be seen that the steering knuckle support arm 9 stands in a vertical position, and that the guiding gear assemblies A and B stand one above the other with their shafts 8 and 10 so positioned that their axial centerlines both fall in a common transverse vertical plane. Also, due to the pivotal connections of the guide arms 4 and 5, and 6 and 7, with the brackets 1 and 2 and the arms 42 and 44, and 42' and 44', the axial centerlines of the vertically spaced shafts 8 and 10 will at all times remain in said common transverse vertical plane during their up and down movements in operation. The fits between the various moving parts in this suspension are as snug as possible but yet permitting free movement without looseness, the outer faces of the brackets 1 and 2 are in a common longitudinal vertical plane, the guide arms 4—7 are of equal length, and the arrangement of parts is such that a true vertical movement of the steering knuckle support arm 9 with relation to the vehicle frame is assured for every change in height of the coil supporting spring 16. The wheel 11 being mounted upon the steering knuckle spindle, and the steering knuckle and kingpin being mounted upon the steering knuckle support arm 9, it will be seen that said true vertical movement of the steering knuckle support arm will be imparted to the wheel and cause any bodily vertical movement of the wheel to be limited to said true vertical travel, regardless of any steering angle the wheel may be occupying at the moment.

The shaft 8 of the upper guiding gear assembly A being rigidly fixed to the upper end portion of the steering knuckle support arm 9, and the shaft 10 of the lower guiding gear assembly B being rigidly fixed to a lower portion of the steering knuckle support arm 9, preferably in line with the inner end of the steering knuckle spindle upon which the wheel 11 is mounted, it will be clear that any vertical movement of the wheel 11 will be as a unit with the vertical movement of the steering knuckle support arm 9, even though the wheel may at the same time change its steering angles by reason of the steering knuckle.

As stated, Figs. 1 and 2 show the parts in the position they occupy when the vehicle load is normal and the wheels are in contact with a normal level road surface. When however, the wheel 11 comes in contact with a bump 53 in the road, the wheel will be forced upwardly which simultaneously carries the steering knuckle support arm 9 up the same amount together with the guiding gear assemblies A and B, as seen in solid lines in Figs. 3 and 4. The guide arms 4—7, during this upward movement cause the outer cage member 22, of each of the guiding gear assemblies A and B, to rotate upon its shaft 8, or 10, in a clockwise direction an amount equal to the counterclockwise rotation of the inner cage member 21, as viewed in Fig. 4, this equal but opposite rotation of these two cage members being effected by the two ring gears 23 and 24 and the spider gears 39 as previously explained. This means that the wheel during its upward movement from normal smooth road level to the top of the bump 53 has moved in true vertical travel with relation to the vehicle frame, as it will also do in returning from the top of the bump to normal smooth road level. During this upward movement from meeting the bump, the A-frame 13 swings upwardly because of the upward movement of the steering knuckle support arm 9, and compresses the coil spring 16, which additional spring compression causes the wheel to spring back to the normal smooth road surface when the bump is passed. Should the upward movement of the wheel be any substantial amount, the link shackle 14 will swing outwardly any necessary amount to permit the connection between the outer end of the A-frame 13 and the steering knuckle support arm 9 to always move with a true vertical travel without binding. During this true vertical travel of the wheel occasioned by said bump, it will be clear that the camber, if any, of the wheel has constantly remained the same without undergoing any change in amount, because of the vertical movement of the wheel. As stated, when the suspension of the present invention is initially built, it may be made to have a little camber, or no camber, as may be desired, and thereafter the camber, or no camber, will remain as initially built regardless of any bodily movement of the wheel vertically with relation to the frame.

Should the wheel, during travel of the vehicle along the highway, meet a hole or depression 54, see Figs. 3 and 4, the bottom of the wheel will drop thereinto and carry the steering knuckle support arm 9 downwardly to the position indicated by the bottom dotted lines in Figs. 3 and 4. The dotted line position of the upper guiding gear assembly A, for the wheel-in-a-hole position, has not been shown in Fig. 4 because of confusion with the solid line showing of the assembly B in that figure. It will be understood however, that in the lowered position due to the wheel having dropped into a hole in the pavement, the two guiding gear assemblies A and B will still occupy their same relative positions to each other because they are both fixed to the steering knuckle support arm 9 and will travel in true vertical movement with relation to the vehicle frame due to the sturdy guide arms 4–7, the ring gears 23 and 24, and the spider gears 39.

As viewed in Fig. 4, the center of the shaft 10 of the gear assembly B, which, in the form shown, also represents the normal wheel center, is indicated at C to designate the position of the wheel center under normal vehicle load and with the wheel traveling on a normal smooth road level. Also, for illustrative purposes, the rise of the wheel in traveling onto the bump 53 is, in Fig. 4, indicated at R, and the drop of the wheel into the hole 54 is indicated at D. As will be understood however, these rise and drop distances of the wheel will vary with different sizes of bumps and holes on and in the road surface. The normal smooth road level is indicated in Figs. 1–4 at N.

As seen from the above, the vertical movement of the wheel with relation to the frame is always a true vertical travel, regardless of whether caused by an excess load on the vehicle, bumps or holes on and in the road surface, or by other causes. It is also seen that because of this true vertical travel of the wheel, the amount of camber, or absence of camber, will always remain as initially set, and provide much longer life for the tires.

As used herein, the term "vertical" does not always mean a line or plane at right angles to the earth's surface, but rather at right angles to the main plane of the vehicle frame. For example, if the vehicle were passing around a sharp curve that was banked at a steep incline, the term "vertical" would mean the bodily movement of the wheels with relation to the frame of the vehicle, and not at right angles to the main surface of the earth. On the other hand if the vehicle were passing over a perfectly horizontal surface, the vertical bodily movement of the wheels with relation to the frame would be at right angles to both the main plane of the vehicle frame and the earth's surface.

The important feature is that the independent suspension of the present invention is so constructed that when the wheel, or wheels, move bodily upwardly or downwardly with relation to the vehicle frame, there will be no change in the camber, or absence of camber, of the wheel during such up or down bodily movement of the wheel, whereby to very greatly increase the life of the tires. If a small amount of positive camber is desired in one of the front wheels for special reasons, the other front wheel should have a like amount of positive camber to give good steering results. In the present invention the provision of camber is not necessary and is not required, but if a small amount is used it will always remain the same because of the vertical bodily movement of the wheels with relation to the vehicle frame.

As seen in Figs. 2 and 4, the vertical distance between the axial centerlines of the two shafts 8 and 10 of the guiding gear assemblies A and B, is the same as the vertical distance between the axial centerlines of each of the pairs of vertically spaced stub shafts 20 on the respective bracket plates 1 and 2. Also said axial centerlines, which form the axes of rotation for the parts mounted thereon, are parallel with relation to each other, and extend at right angles to the longitudinal vertical plane of the outer faces of the bracket plates 1 and 2. The guide arms 4—7 are stiff and do not bend during their swinging operation.

Having described our invention, we claim:

1. An independent suspension for automotive vehicles, comprising, a vehicle frame having a pair of longitudinally spaced apart bracket plates fixed thereto, each of said bracket plates having a pair of vertically spaced stub shafts fixed thereto to extend outwardly therefrom, a wheel, a vertically extending support arm to which said wheel is rotatably connected, a pair of parallel shafts secured to said support arm at vertically spaced positions, the distance between the axial centerlines of said two parallel shafts being the same as the vertical distance between the two axial centerlines of the stub shafts on each of said two bracket plates, a guiding gear assembly on each of said parallel shafts on the support arm, each of said guiding gear assemblies including an inner cage member and a coaxial outer cage member rotatable in opposite directions with relation to each other, each of said cage members having an outwardly projecting arm having a journal pin fixed thereto and extending toward the vehicle frame, and two pairs of guide arms, each of said guide arms being pivotally connected at its inner end to one of said journal pins and at its outer end to one of said stub shafts.

2. An independent suspension as claimed in claim 1, in which each of said parallel shafts, journal pins, and stub shafts are parallel to each other, and extend at right angles to the longitudinal vertical plane of the outer faces of the bracket plates.

3. A true vertical travel independent suspension for automotive vehicles, comprising, a vehicle frame, a wheel, a steering knuckle support arm to which said wheel is rotatably connected, a pair of guiding gear assemblies mounted in vertically spaced relation on said support arm, each of said guiding gear assemblies comprising two coaxial cage members rotatable with relation to each other equal amounts in opposite directions, each of said cage members having an outwardly projecting arm, and two vertically spaced pairs of guide arms, each of the guide arms of one pair being pivotally connected at its inner end to a projecting arm of a cage member of the upper guiding gear assembly and at its outer end being pivotally connected with the frame, and each of the guide arms of said other pair being pivotally connected at its inner end to a projecting arm of a cage member of the lower guiding gear assembly and at its outer end being pivotally connected with the frame, the vertical distance between the pivotal connections of the outer ends of the guide arms with the frame at one end of the two pairs of guide arms being the same as that at the other end of the two pairs of guide arms, and the same as the respective vertical distances between the pivotal connections of the inner ends of the guide arms with the projecting arms of the cage members.

4. An independent suspension as claimed in claim 3, in which each of said guiding gear assemblies includes a main shaft fixed to the steering knuckle support arm, one of said main shafts being fixed to the steering knuckle support arm at a point vertically spaced from the point where the main shaft of the other guiding gear assembly is fixed to said support arm, each pair of cage members being rotatably mounted on its respective one of said shafts and provided with gearing to effect said opposite direction rotation.

5. A true vertical travel independent suspension for automotive vehicles, comprising, a steering knuckle support arm adapted to support a wheel, a guiding gear assembly having a main shaft fixed to said support arm, and a pair of coaxial cage members rotatably mounted on said shaft, means in said cage members for causing any rotation therebetween to be in equal amounts and in opposite directions, each of said cage members having a projecting arm, a pair of guide arms, one of said guide arms being pivotally connected at its inner end to one of said projecting arms and adapted to be pivotally connected at its other end to a vehicle frame, and the other of said guide arms being pivotally connected at its inner end to the other of said projecting arms and adapted to be pivotally connected at its other end to a vehicle frame, one of said guide arms extending rearwardly and the other of said guide arms extending forwardly with relation to the guiding gear assembly, a second guiding gear assembly having a main shaft fixed to said support arm at a point vertically spaced from the first mentioned main shaft, said second guiding gear assembly being similar in construction to the first mentioned guiding gear assembly, and a second pair of similar guide arms similarly connected to the second guiding gear assembly, and adapted to be similarly connected to a vehicle frame as the first mentioned pair of guide arms, said two pairs of guide arms being vertically spaced from each other, the vertical distance between the axes of said two main shafts being the same as the vertical distances between the axes of the respective outer ends of the two pairs of guide arms.

6. An independent suspension for automotive vehicles, comprising, a vehicle frame, a wheel, a vertically extending support arm to which said wheel is rotatably connected, a pair of parallel shafts secured to said support arm at vertically spaced positions, a guiding gear assembly rotatably mounted on each of said shafts, two vertically spaced pairs of guide arms pivotally connected at their inner ends to said guiding gear assemblies and pivotally connected at their outer ends to said vehicle frame, the axes of rotation of the pivotal connections of the guide arms to the guiding gear assemblies and the vehicle frame being parallel with each other and with said shafts, each of said guiding gear assemblies comprising an inner cage member and an outer cage member, both of said cage members of each assembly being rotatably mounted on one of said shafts, each of said pairs of guide arms being respectively connected one guide arm to an inner cage member and one guide arm to an outer cage member.

7. An independent suspension for automotive vehicles, comprising, a vehicle frame, a wheel, a vertically extending support arm to which said wheel is rotatably connected, a guiding gear assembly mounted to extend inwardly of the support arm on an upper portion thereof, said assembly including an inner cage member and an outer cage member, said cage members being connected together for rotative movement in opposite directions in equal amounts, a similar guiding gear assembly mounted to extend inwardly of the support arm on a lower portion thereof, the axes of rotation of said cage members of both of said guiding gear assemblies all lying in a common vertical plane extending transversely of the vehicle frame, a pair of guide arms pivotally connected one to the inner cage member and one to the outer cage member of the upper guiding gear assembly, the opposite ends of the guide arms being pivotally connected to the adjacent side of the vehicle frame at longitudinally spaced points, a second pair of similar guide arms similarly connected to the lower guiding gear assembly and the vehicle frame, the two pairs of guide arms rotating the two inner cage members in one direction and rotating the two outer cage members in the opposite direction when the wheel and its support arm move up or down beyond normal mid-position, whereby to cause any up and down movements of the wheel to be always bodily vertical with relation to the vehicle frame, each of the inner cage members of each of said assemblies being formed with a ring gear, and each of the outer cage members being formed with a ring gear laterally spaced from but facing the ring gear of its complemental inner cage member, and a series of spider gears in meshing engagement with their respective ring gears to effect said rotative movement of the cage members in opposite directions.

8. An independent suspension for automotive vehicles, comprising, a vehicle frame, a wheel, a vertically extending support arm to which said wheel is rotatably connected, a pair of parallel shafts secured to said support arm at vertically spaced positions, a guiding gear assembly mounted on each of said shafts, each of said guiding gear assemblies including coaxial inner and outer cage members and intermediate gearing therebetween so that the cage members of each guiding gear assembly will be forced to rotate on their respective shaft equal amounts in opposite directions, two pairs of guide arms, each of said guide arms being pivotally connected at one end to one of said cage members and at its other end pivotally connected to the vehicle frame, and a bottom support frame pivotally connected at its outer end to the lower end of the support arm and at its inner end connected by a shackle to a transverse frame member, said bottom support frame being adapted to receive a vehicle supporting spring, whereby any up and down movement of the wheel will bodily have true vertical travel with relation to the vehicle frame, the axial centerlines of both of said parallel shafts falling in a common vertical plane which extends transversely of the vehicle frame, and continually following said plane during all of said up and down movements of the wheel.

9. A true vertical travel independent suspension for automotive vehicles, comprising, a vehicle frame, a wheel, a steering knuckle support arm to which said wheel is rotatably connected, a pair of guiding gear assemblies mounted in vertically spaced relation on said support arm, each of said guiding gear assemblies comprising two coaxial cage members rotatable with relation to each other equal amounts in opposite directions, each of said cage members having an outwardly projecting arm, and two vertically spaced pairs of guide arms, each of the guide arms of one pair being pivotally connected at its inner end to a projecting arm of a cage member of the upper guiding gear assembly and at its outer end being pivotally connected with the frame, and each of the guide arms of said other pair being pivotally connected at its inner end to a projecting arm of a cage member of the lower guiding gear assembly and at its outer end being pivotally connected with the frame, the upper and lower guide arms of the two pairs on one side of the guiding gear assemblies being at all times substantially parallel with each other, and the upper and lower guide arms of the two pairs on the other side of the guiding gear assemblies being at all times substantially parallel with each other.

References Cited in the file of this patent
UNITED STATES PATENTS

| | | |
|---|---|---|
| 2,028,991 | Pernice | Jan. 28, 1936 |
| 2,082,620 | Ellefsen | June 1, 1937 |